United States Patent
Kolb et al.

(10) Patent No.: US 6,790,555 B2
(45) Date of Patent: Sep. 14, 2004

(54) ELECTROCHEMICAL CELL HAVING A CONTROLLED ELECTRODE SURFACE

(75) Inventors: Eric S. Kolb, Action, MA (US); Denis G. Fauteux, Acton, MA (US); Keiichi Seki, Yokohama (JP)

(73) Assignee: Mitsubishi Chemical Corporation (JP)

( * ) Notice: Subject to any disclaimer, the term of this patent is extended or adjusted under 35 U.S.C. 154(b) by 268 days.

(21) Appl. No.: 09/963,800

(22) Filed: Sep. 26, 2001

(65) Prior Publication Data

US 2002/0106560 A1 Aug. 8, 2002

Related U.S. Application Data

(63) Continuation-in-part of application No. 09/362,147, filed on Jul. 28, 1999, now abandoned.

(51) Int. Cl.$^7$ ............................................. H01M 10/34
(52) U.S. Cl. ..................... 429/59; 429/231.8; 429/101; 429/57; 429/105
(58) Field of Search .................. 429/59, 101, 104, 429/105, 57, 188, 231.8, 231.9, 231.95, 307, 324, 325, 331, 336, 207, 306, 327, 328, 329, 347

(56) References Cited

U.S. PATENT DOCUMENTS 5,965,297 A * 10/1999 Fauteux et al. .......... 429/231.8
6,045,937 A * 4/2000 Kolb et al. .................... 429/59
6,228,531 B1 * 5/2001 Kolb et al. .................. 429/212
6,268,080 B1 * 7/2001 Fauteux et al. ............. 429/188
6,358,289 B1 * 3/2002 Fauteux et al. ............. 29/623.1
6,495,287 B1 * 12/2002 Kolb et al. .................. 429/215
6,613,475 B2 * 9/2003 Fauteux et al. ............. 429/215

FOREIGN PATENT DOCUMENTS

| JP | 5-82168 | 4/1993 |
| JP | 7-122297 | 5/1995 |
| JP | 8-4015 | 1/1996 |

* cited by examiner

*Primary Examiner*—Bruce F. Bell
*Assistant Examiner*—Monique Wills
(74) *Attorney, Agent, or Firm*—Factor & Lake

(57) ABSTRACT

The present invention relates to an electrochemical cell having a controlled electrode surface, comprising:
- a first electrode and a second electrode wherein at least one of the first and second electrodes has a carbonaceous surface;
- an electrolyte containing at least one solvent;
- an additive associated with the carbonaceous surface of at least one of the first and second electrodes, wherein the additive comprises a compound having a molecular weight of not less than 105.

6 Claims, 2 Drawing Sheets

ELECTROCHEMICAL CELL HAVING A CONTROLLED ELECTRODE SURFACE

This is a Continuation-In-Part of U.S. patent Ser. No. 09/362,147 filed Jul. 28, 1999, now abandoned.

BACKGROUND OF THE INVENTION

1. Field of the Invention

The present invention relates in general to electrochemical cells, and more particularly, to secondary electrochemical cells having a passivating additive that substantially precludes the formation of gas within the electrochemical cell as a result of decomposition of solvents contained within the electrolyte, and wherein the additive itself does not form a gas from its own decomposition during cell cycling and storage. The present invention also relates to a secondary electrochemical cells excellent in rate characteristics and a capacity retention percentage after repeating charge and discharge cycles.

2. Background Art

Lithium ion batteries have been known in the art for several years. Furthermore, lithium ion batteries comprising carbonaceous electrodes and liquid, gel, polymer, or plastic electrolytes are likewise well known. While these electrolytes have been readily utilized, problems have been identified with respect to commercial solvents, contained within the electrolytes, decomposing during cell cycling and storage. In particular, without the presence of at least a conventional additive within the cell to form a passivating layer, the solvent reacts with the carbonaceous surface of the electrode and partially decomposes during an initial charge. This decomposition, in turn, results in the formation of gas which adversely affects the cell's electrochemical performance.

Although conventional additives have been used to form a passivating layer which substantially prevents the solvent from contact and subsequent decomposition with the carbonaceous electrode, problems nevertheless persist. Specifically, the additive itself undergoes decomposition during cell cycling and storage, which results in the generation of significant amounts of gas within the cell.

Further, by using the conventional additives, there is a problem that essential properties of electrochemical cell such as rate characteristics and a capacity retention percentage after repeating charge and discharge cycles are deteriorated.

SUMMARY OF THE INVENTION

An object of the present invention is to provide an electrochemical cell having an additive that, among other things, remedies the aforementioned detriments and/or complications associated with the use of a conventional additive.

As a result of the present inventors' earnest study, it has been found that by using additives having specific chemical structure, the above problem can be solved.

In the first aspect of the present invention, there is provided an electrochemical cell having a controlled electrode surface, comprising:

a first electrode and a second electrode wherein at least one of the first and second electrodes has a carbonaceous surface;

an electrolyte containing at least one solvent;

an additive associated with the carbonaceous surface of at least one of the first and second electrodes, wherein the additive comprises a compound having a molecular weight of not less than 105 and represented by the formula:

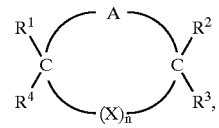

wherein A is a group represented by:

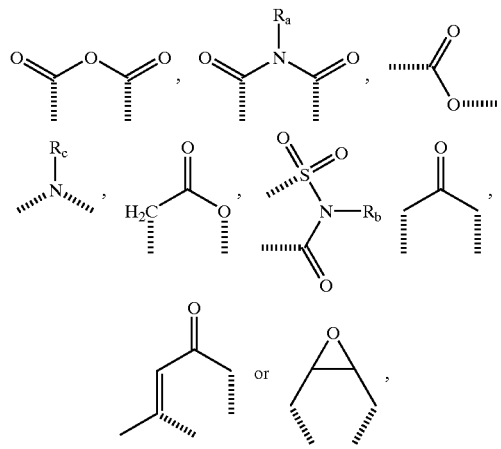

wherein X is a group represented by the formula:

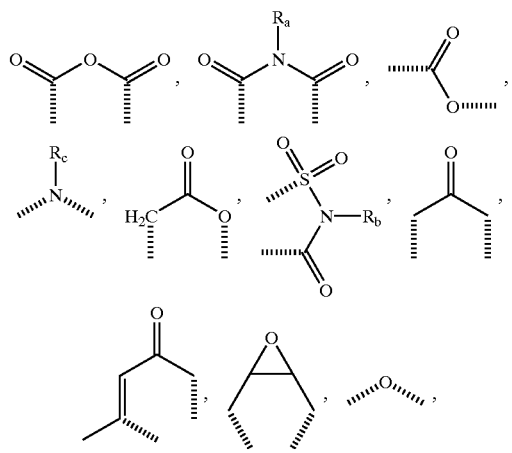

or linear or branched alkyl group containing 1 to 12 carbons, wherein n is 0, 1, 2, or 3; and wherein $R_a$, $R_b$, $R_c$, $R^1$, $R^2$, $R^3$ and $R^4$ are independently hydrogen or a linear or branched alkyl group containing 1 to 12 carbons.

In the second aspect of the present invention, there is provided an electrochemical cell having a controlled electrode surface, comprising:

a first electrode and a second electrode wherein at least one of the first and second electrodes has a carbonaceous surface;

an electrolyte containing at least one solvent;

an additive associated with the carbonaceous surface of at least one of the first and second electrodes, wherein the additive comprises a compound having a molecular weight of not less than 105 and represented by the formula:

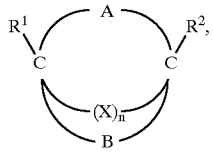

wherein A is a group represented by:

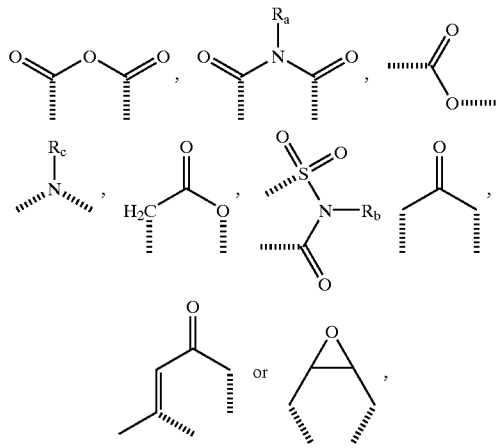

wherein X is a group represented by the formula:

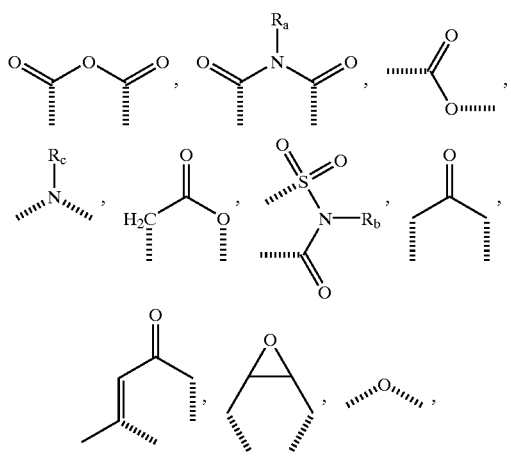

or a linear or branched alkyl group containing 1 to 12 carbons, wherein n is 0, 1, 2, or 3; and wherein B is a group represented by:

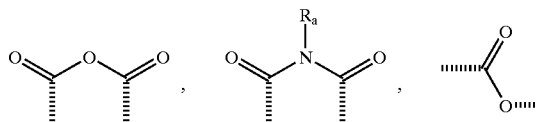

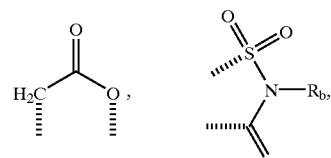

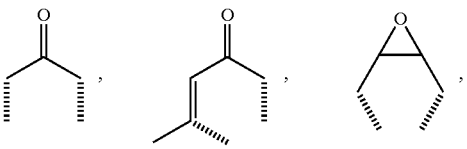

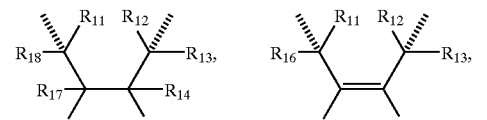

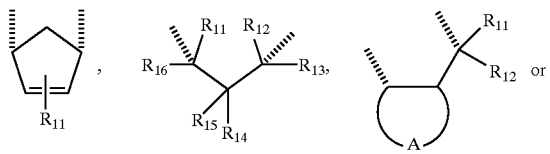

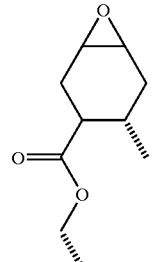

wherein $R^1$, $R^2$, $R_a$, $R_b$, $R_c$, $R^{11}$, $R^{12}$, $R^{13}$, $R^{14}$, $R^{15}$, $R^{16}$, $R^{17}$ and $R^{18}$ are independently hydrogen or a linear or branched alkyl group containing 1 to 12 carbons.

In the third aspect of the present invention, there is provided an electrochemical cell having a controlled electrode surface, comprising:

a first electrode and a second electrode wherein at least one of the first and second electrodes has a carbonaceous surface;

an electrolyte containing at least one solvent;

an additive associated with the carbonaceous surface of at least one of the first and second electrodes, wherein the additive comprises a compound having a molecular weight of not less than 105 and represented by the formula:

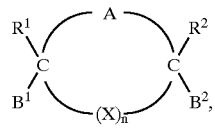

wherein A is a group represented by:

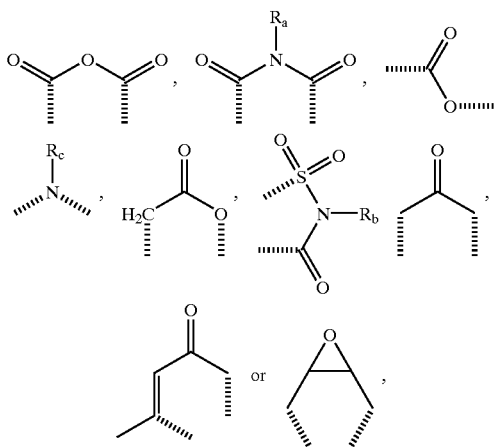

wherein X is a group represented by the formula:

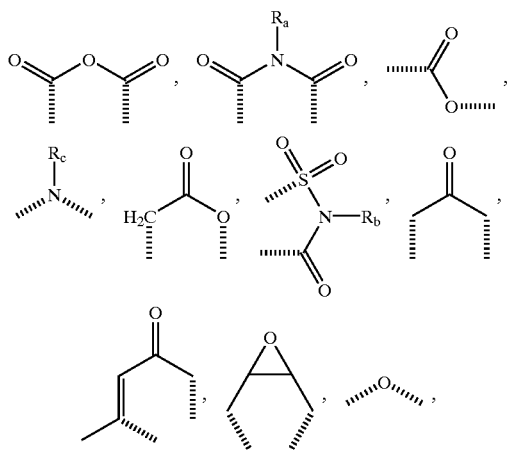

or a linear or branched alkyl group containing 1 to 12 carbons, wherein n is 0, 1, 2, or 3;

wherein $B^1$ and $B^2$ are independently hydrogen, a linear or branched alkyl group containing 1 to 12 carbons or a group represented by:

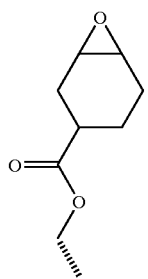

wherein R, $R^1$, $R^2$, $R_a$, $R_b$, and $R_c$ are independently hydrogen or a linear or branched alkyl group containing 1 to 12 carbons.

In a preferred embodiment of the invention, the above-identified electrochemical cells further comprise means associated with the additive for substantially precluding gas formation within the electrochemical cell as a result of decomposition of the additive during cell cycling and storage.

In another preferred embodiment of the invention, the above-identified electrochemical cells further comprise means for increasing first cycle coulombic efficiency of the electrochemical cell relative to an electrochemical cell without the additive. In this embodiment the efficiency increasing means comprises the additive.

In yet another preferred embodiment of the invention, the additive is substantially soluble in the solvent of the electrolyte at ambient temperature.

In an alternative embodiment of the invention, the additive is substantially insoluble in the solvent of the electrolyte at ambient temperature.

BRIEF DESCRIPTION OF THE DRAWINGS

The invention will now be described with reference to the drawings wherein.

DETAILED DESCRIPTION OF THE INVENTION

Figure 1:
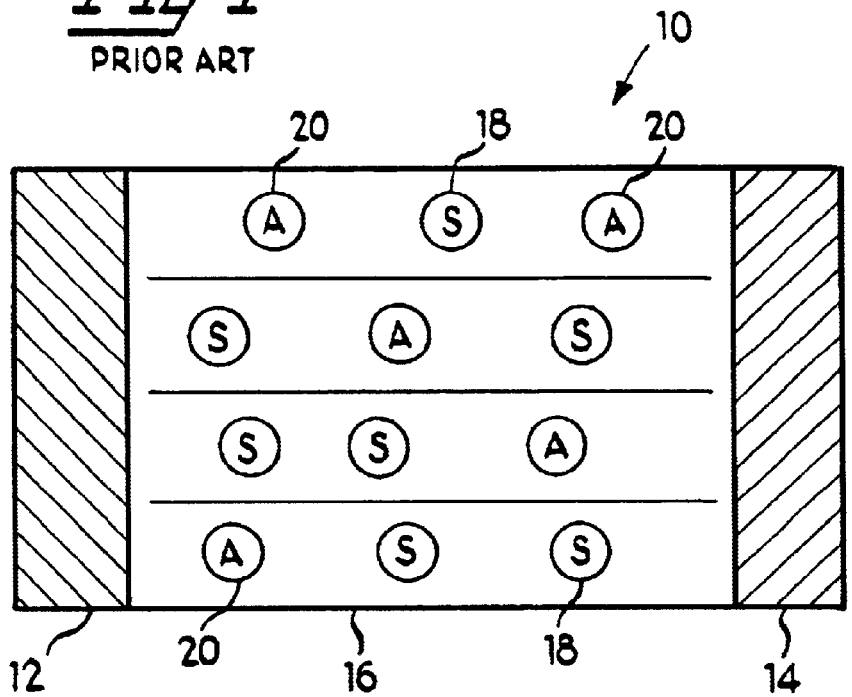
FIG. 1 of the drawings is a schematic representation of a prior art electrochemical cell prior to an initial charge.

While this invention is susceptible of embodiment in many different forms, there is shown in the drawings and will herein be described in detail several embodiments with the understanding that the present disclosure is to be considered as an exemplification of the principles of the invention and is not intended to limit the invention to the embodiments illustrated.

Referring now to the drawings and to FIG. 1 in particular, a prior art electrochemical cell 10 is shown prior to an application of an electrical charge, which comprises first (carbonaceous) electrode 12, second electrode 14, and electrolyte 16. Electrolyte 16 includes solvent 18 and conventional additive 20.

Figure 2:
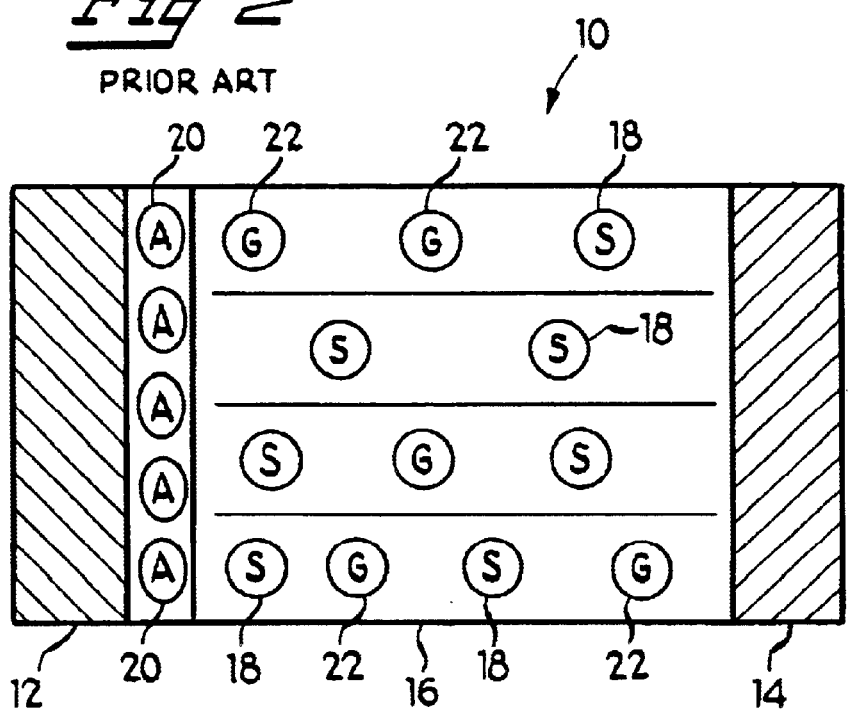
FIG. 2 of the drawings is a schematic representation of a prior art electrochemical cell sub subsequent to an initial charge.

Prior art electrode 10 is shown in FIG. 2, subsequent to an initial electrical charge, which comprises first electrode 12, second electrode 14, electrolyte 16 and passivating layer 20. Passivating layer 20 is formed, in part, upon interaction of the conventional additive with the carbonaceous electrode—prior to interaction by the solvent in the electrolyte. Although such a passivating layer substantially blocks the solvent from contact with the carbonaceous electrode, it will, unfortunately, generate significant amounts of gas 22 as it begins to decompose during cell cycling and storage. And further, essential properties of electrochemical cell such as rate characteristics and a capacity retention percentage after repeating charge and discharge cycles may be deteriorated.

Figure 3:
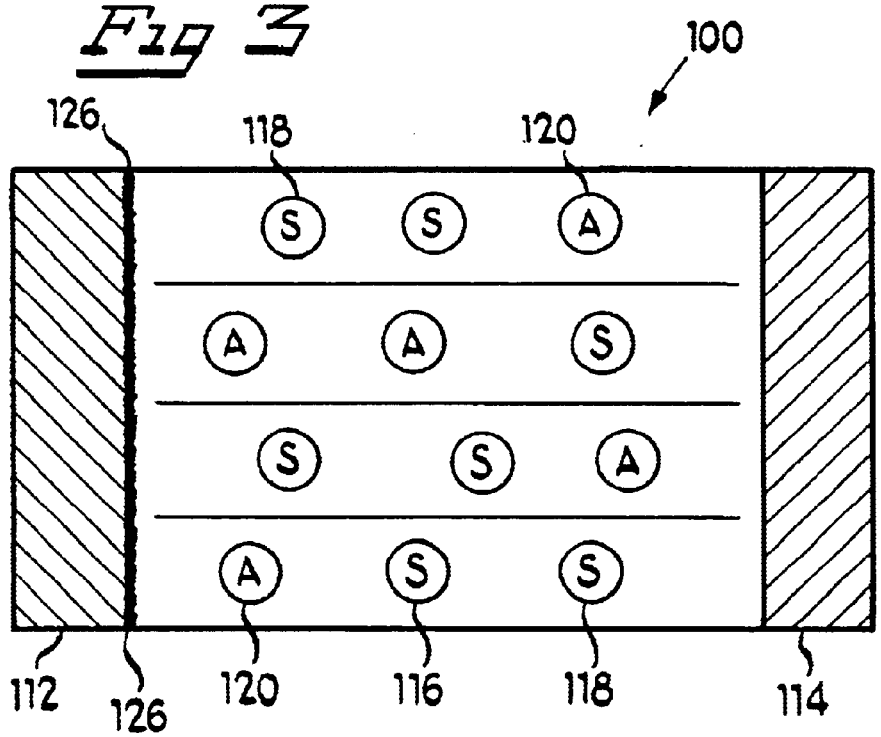
FIG. 3 of the drawings is a schematic representation of an electrochemical cell in accordance with the present invention prior to an initial charge.

Electrochemical cell 100 of the present invention is shown in FIG. 3, prior to application of an initial electrical charge, which generally comprises first electrode 112 having a carbonaceous surface 126, second electrode 114, and electrolyte 116. Electrolyte 116 includes solvent 118 and additive 120. While additive 120 is shown, for illustrative purposes only, as initially associated with electrolyte 116, it is also contemplated that additive 120 can be directly associated with first electrode 112. For example, when the desired additive is substantially insoluble in the electrolyte, the additive will be initially associated with the electrode. Such association can be accomplished by any one of a number of conventional techniques including, but by no means limited to, spraying, rolling, coating or by mixing the additive with the active material prior to application onto an associated current collector. If the additive is substantially soluble with the electrolyte, then it can be mixed with the electrolyte at almost any time—using conventional mixing techniques.

Also, for purposes of the present disclosure, solvent 118 will be identified as comprising an organic carbonate solvent, such as propylene carbonate (PC) or ethylene carbonate (EC). It will be understood, however, that other commercially available and conventionally used solvents or electrochemical systems (such as liquid, polymer, gel, and plastic) as would be readily understood to those having ordinary skill in the art having the present disclosure before them, are likewise contemplated for use.

In a first embodiment of the invention, additive 120 comprises a compound having a molecular weight of not less than 105 and represented by the following formula.

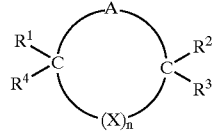

Preferably A is a group represented by the following formula.

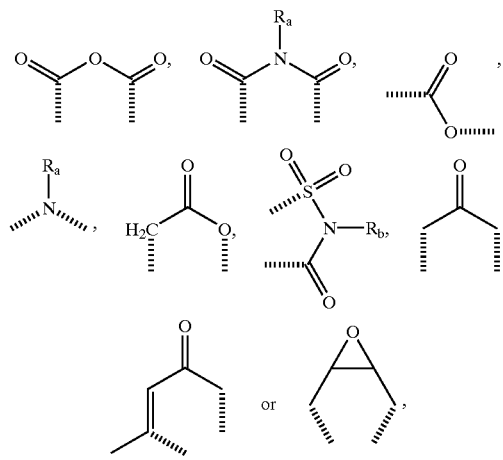

Preferably X is a group represented by the formula:

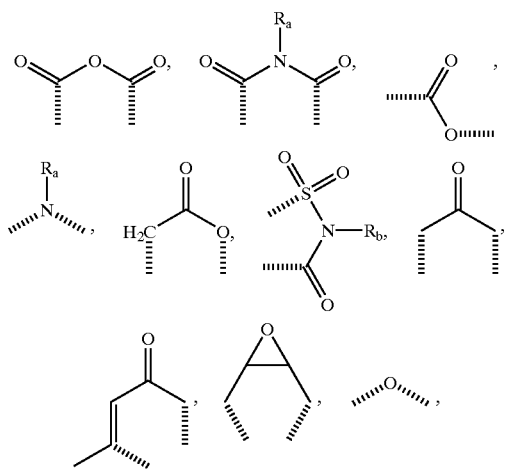

or a linear or branched alkyl group containing 1 to 12 carbons.

Preferably n is 0, 1, 2, or 3, and R, $R_a$, $R_b$, $R_c$, $R^1$, $R^2$, $R^3$ and $R^4$ are independently hydrogen or a linear or branched alkyl group containing 1 to 12 carbons.

In a second embodiment of the invention, additive 120 comprises a compound having a molecular weight of not less than 105 and represented by the following formula:

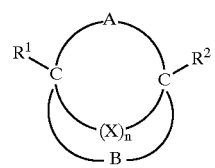

Preferably A is a group represented by the following formula:

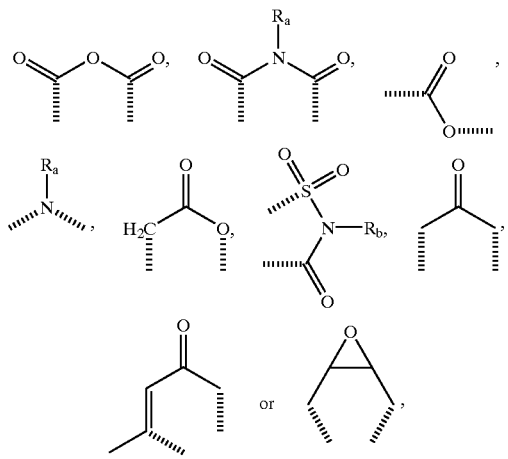

Preferably X is a group represented by the formula:

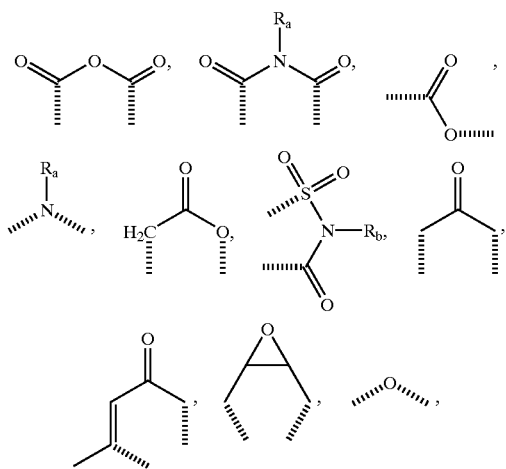

or a linear or branched alkyl group containing 1 to 12 carbons.

Preferably n is 0, 1, 2, or 3 and B is a group represented by the formula:

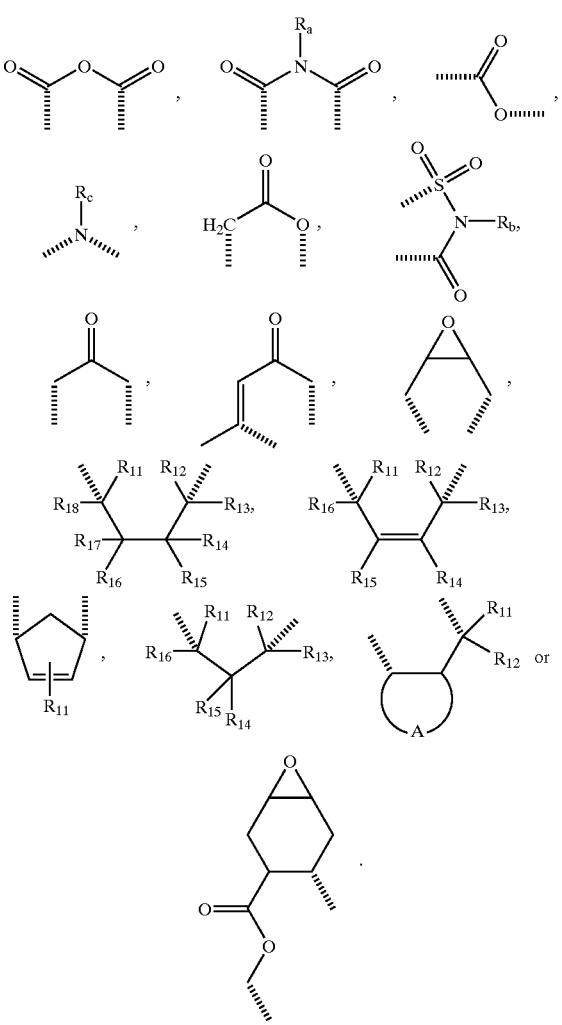

Preferably $R^1$, $R^2$, $R_a$, $R_b$, $R_c$, $R^{11}$, $R^{12}$, $R^{13}$, $R^{14}$, $R^{15}$, $R^{16}$, $R^{17}$ and $R^{18}$ are independently hydrogen a linear or branched alkyl group containing 1 to 12 carbons.

In a third embodiment of the invention, additive 120 comprises a compound having a molecular weight of not less than 105 and represented by the following formula:

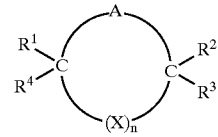

Preferably A is a group represented by the following formula:

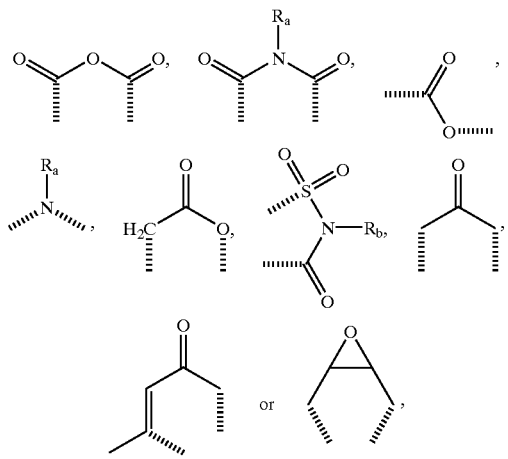

Preferably X is a group represented by the formula:

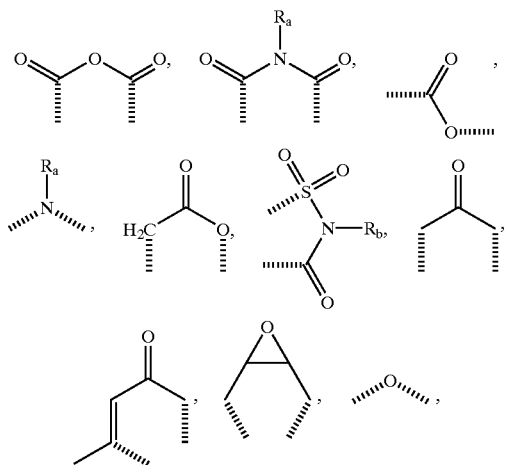

or a linear or branched alkyl group containing 1 to 12 carbons.

Preferably n is 0, 1, 2, or 3 and $B^1$ and $B^2$ are independently hydrogen, a linear or branched alkyl group containing 1 to 12 carbons or a group represented by:

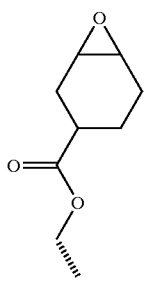

Preferably R, R¹, R², $R_a$, $R_b$, and $R_c$ are independently hydrogen or a linear or branched alkyl group containing 1 to 12 carbons.

The above mentioned additives 120 have a molecular weight of not less than 105, preferably not less than 110 and usually not more than 1000, preferably not more than 300. When the molecular weight thereof is too small, not only it may be easy to generate gas by the decomposition of additive itself, but also essential properties of electrochemical cell such as rate characteristics and a capacity retention percentage after repeating charge and discharge cycle may be deteriorated. When the molecular weight thereof is too large, inhibiting factor to charge and discharge may be increased and the ionic conduction may be inhibitted.

Specific additives in accordance with the above-identified embodiments include, for example:

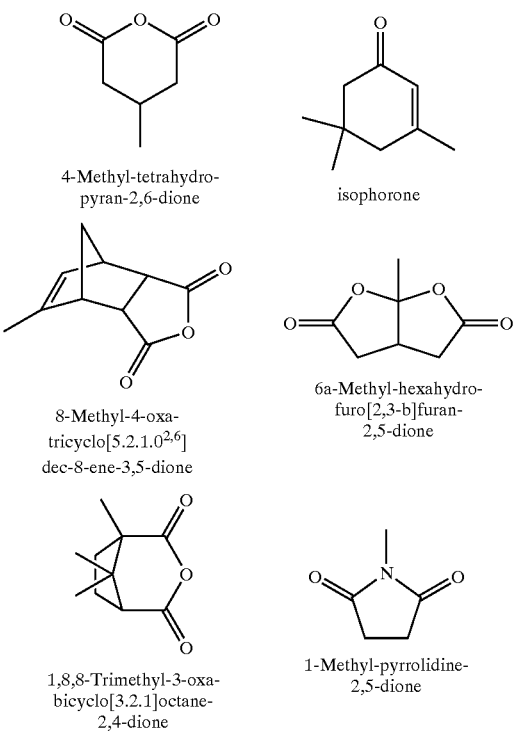

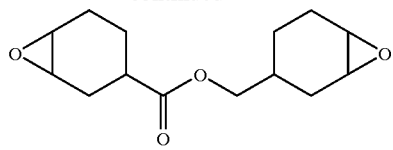

7-Oxa-bicyclo[4.1.0]heptane-3-carboxylic acid
7-oxa-bicyclo[4.1.0]hept-3-ylmethyl ester Several of additives 120 having a molecular weight of not less than 105 and represented by the above-identified chemical structures, are available in their fully synthesized form from Aldrich Chemical Co., of Milwaukee, Wis. Additives that are not available in their fully synthesized form can be made by purchasing precursors from Aldrich, and then carrying out conventional organic synthesis as provided in *Organic Chemistry*, Neckers and Doyle, Wiley Publishers (1977) and *Organic Chemistry* $3^{rd}$ *Ed.*, McMurry, Brooks and Cole Publishing Co. (1992). Both of these references are hereby incorporated herein in their entirely for purposes of preparing the above-identified additives.

Figure 4:
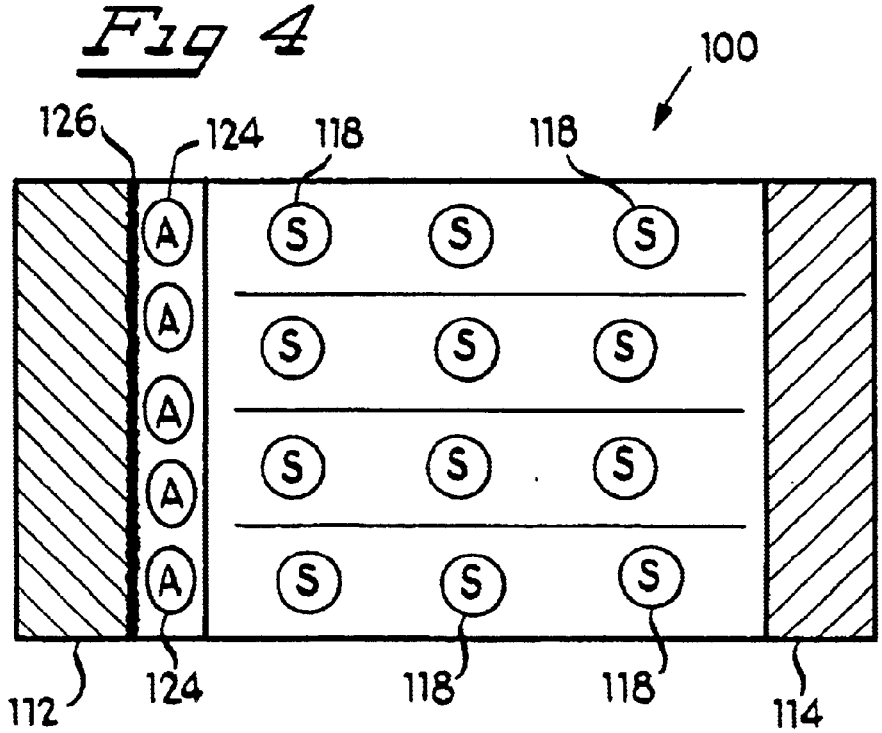
FIG. 4 of the drawings is a schematic representation of an electrochemical cell in accordance with the present invention subsequent to an initial charge.

Electrochemical cell 100 is shown in FIG. 4, subsequent to application of an initial charge, which comprises passivating layer 124 on carbonaceous surface 126 of first electrode 112. The passivating layer forms as a result of reducing the additive near the interface between electrolyte 116 and carbonaceous surface 126 of first electrode 112. As previously explained, such a passivating layer will substantially block solvent 118 from contacting the carbonaceous surface 126 and, in turn, substantially preclude the generation of gas which would otherwise result from decomposition of the solvent. In addition, notwithstanding the fact that the additive will itself eventually decompose, such decomposition will not result in the generation of any significant, if any, gas. Accordingly, it has been found that not only is gas generation substantially eliminated, but also the cells first cycle coulombic efficiency, rate characteristics and a capacity retention percentage after repeating charge and discharge cycles can be impressively increased as compared to cells which were fabricated without an additive of the present invention.

The process associated with the manufacture of electrochemical cell 100 (FIGS. 3 and 4), as well as the actual chemical process which occurs within the cell upon initial electrical charging, comprises the following steps: First, the initial cell is manufactured by fabricating first electrode 112, second electrode 114, and electrolyte 116. For purposes of the present disclosure, first electrode 112 will comprise an anode having a carbonaceous surface 126, and second electrode 114 will comprise a cathode. Of course, in a secondary cell configuration, the anode and cathode will become interchangeable with each other, depending on whether the cell is charging or discharging. The particular electrolyte, as well as the electrodes, will be fabricated using conventional techniques. Additionally, solvent 118 and additive 120 having a molecular weight of not less than 105 may initially be associated with electrolyte 116—the preferred additive concentration ranges from approximately 0.1% to 10% by wt. However, as previously explained, additive 120 may alternatively, or likewise, be directly associated with first electrode 112.

After electrochemical cell 100 has been fabricated, passivating layer 124 is formed by applying an initial charge to the cell. After the initial charge is applied, additive 120 having a molecular weight of not less than 105 is reduced near the interface between carbonaceous surface 126 of first electrode 112 and electrolyte 116. The term "reduced" is understood not only to be a formal reduction, but also as any alteration from the additive's original, pre-reduced state. Such a reduction includes any modification to the chemical structure of the additive so that it is at least substantially insoluble within the electrolyte 116, or alternatively, associated with the carbonaceous electrode/anode.

The passivating layer substantially blocks solvent 118 in electrolyte 116 from contact with the carbonaceous surface. Accordingly, such blocking substantially precludes solvent decomposition, and more particularly, gas formation within electrochemical cell 100. Furthermore, while reduced additive 120, and in turn, passivating layer 124, will eventually decompose during cell cycling and storage, such decomposition will be substantially devoid of any gas generation.

In a conventional cell using a conventional additive, by solvent decomposition which would otherwise occur upon contact with the carbonaceous surface and by decomposition of a conventional additive, there are problems of a substantial loss of coulombic efficiency, deterioration of rate characteristics and decrease of a capacity retention percentage after repeating charge and discharge cycles. On the other hand, in the present invention, since the above problem in the conventional cell can be solved, the electrochemical cell using the additive according to the present invention has improved and excellent properties such as coulombic efficiency, rate characteristics and a capacity retention percentage after repeating charge and discharge cycles as compared with the conventional cell.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

The following explanation is a secondary electrochemical cell which is a lithium secondary battery according to the present invention. The lithium secondary battery usually comprises a first electrode and a second electrode corresponding to a positive electrode and negative electrode, and electrolyte layer associated with the above mentioned electrodes. The first and second electrodes usually comprise a collector and an active material bound on the said collector. Therefore, various change can be performed within the aspect of the present invention and can be exemplified as follows.

Collector Substrate:

The materials usable for the collector substrate include, beside copper mentioned above, various metals such as aluminum, nickel, stainless steel, etc., and their alloys. Preferably aluminum is used for the collector substrate of the positive electrode and copper for the collector substrate of the negative electrode.

The thickness of the collector may be properly selected to suit the situation, but it is preferably 1 to 30 $\mu$m, more preferably 1 to 20 $\mu$m. A collector thickness of less than 1 $\mu$m tends to fail to provide sufficient mechanical strength, giving rise to the problems in battery production. On the other hand, when the collector thickness exceeds 30 $\mu$m, the capacity of the battery as a whole may be reduced.

The collector surface is preferably subjected to a roughening treatment in advance because this treatment contributes to the enhancement of adhesive strength of electrode material. Various methods such as mechanical polishing, electrolytic polishing and chemical polishing can be used for the surface roughening treatment. Mechanical polishing includes a method in which the collector surface is polished by a polishing cloth or paper having abrasive grains secured thereto, or by whetstone, emery buff or a wire brush comprising steel or other metal wires. An intermediate layer may be provided on the collector surface for elevating adhesive strength or conductivity.

As for the geometry of the collector, it may be metal mesh or plate.

Active Material:

The active material used for the first electrode or the second electrode may be suitably selected according to the type and specific properties of the battery to be produced. In the present invention, a granular carbonaceous material such as carbon black or graphite is preferably used as the active material for the first or second electrode because use of such material is most conducive to deriving the maximal effect of the present invention.

In the case of lithium secondary battery, both inorganic compounds and organic compounds can be used as the positive electrode active material provided that they are capable of intercalating and releasing lithium ions. The inorganic compounds usable for the above purpose include chalcogen compounds, for example, transition metal oxides such as $MnO$, $V_2O_5$, $V_6O_{13}$ and $TiO_2$, lithium/transition metal composite oxides such as lithium nickelate, lithium cobaltate and lithium manganate, and transition metal sulfides such as $TiS_2$, $FeS$ and $MoS_2$. As transition metal, Fe, Co, Ni, Mn and the like can be used. In order to improve their properties, these compounds may be partially substituted with elements. The organic compounds usable as the active material in the present invention include, for example, polyaniline, polypyrrole, polyacene, disulfide type compounds and polysulfide type compounds. Mixtures of these inorganic and organic compounds are also usable as the positive electrode material. Preferably, a composite oxide comprising lithium and at least one transition metal selected from the group consisting of cobalt, nickel and manganese is used.

The grain size of the positive electrode active material may be properly selected in accordance with other structural elements of the battery, but it is usually 1 to 30 $\mu$m, preferably 1 to 10 $\mu$m, because this range of grain size is especially effective for improving battery properties such as initial efficiency and charge/discharge cycle performance.

The above-mentioned granular carbonaceous materials are usually used as the negative electrode active material which is capable of occluding and releasing lithium ions. Such carbonaceous materials can be used in the form of a mixture or coated with a metal, metal salt, oxide, etc. Oxides or sulfates of metals such as silicon, tin, zinc, manganese, iron and nickel, metallic lithium, lithium alloys such as Li—Al, Li—Bi—Cd and Li—Sn—Cd, lithium transition metal nitrides and silicone are also usable as the negative electrode active material. In view of the improvement of battery properties such as initial efficiency, rate characteristics and cycle performance, the mean grain size of the negative electrode active material is usually not more than 12 μm, preferably not more than 10 μm. When the mean grain size is more than 12 μm, the electronic conductivity may be deteriorated. The lower threshold value of the mean grain size is usually 0.5 μm, preferably 7 μm.

Other Structural Components in the Electrode:

A binder is preferably used for binding the active material on the collector. The inorganic compounds such as silicates and glass, and various types of resins mainly composed of polymers can be used as binder.

Examples of the resins usable as binder include alkane polymers such as polyethylene, polypropylene and poly-1,1-dimethylethylene; unsaturated polymers such as polybutadiene and polyisoprene; polymers having a ring such as polystyrene, polymethylstyrene, polyvinylpyridine and poly-N-vinylpyrrolidone; acrylic polymers such as polymethyl methacrylate, polyethyl methacrylate, polybutyl methacrylate, polymethyl acrylate, polyethyl acrylate, polyacrylic acid, polymethacrylic acid and polyacrylamide; fluorine resins such as polyvinyl fluoride, polyvinylidene fluoride and polytetrafluoroethylene; CN group-containing polymers such as polyacrylonitrile and polyvinylidene cyanide; polyvinyl alcohol-based polymers such as polyvinyl acetate and polyvinyl alcohol; halogen containing polymers such as polyvinyl chloride and polyvinylidene chloride and conductive polymers such as polyaniline. Mixtures, modified products, derivatives, random copolymers, alternating copolymers, graft copolymers and block copolymers of the above polymers are also usable.

The amount of the binder to be used is preferably 0.1 to 30 parts by weight, more preferably 1 to 15 parts by weight, based on 100 parts by weight of the active material. If the amount of the binder used is less than 0.1 part by weight, the produced electrode may prove unsatisfactory in strength. Use of the binder in excess of 30 parts by weight may invite a reduction of capacity and/or rate characteristics of the battery.

Conductive materials, reinforcing agents, and various other additives such as powder, filler, etc., that produce the specific functions may be contained as desired in the electrode. As the conductive material, it is possible to use any type of material which is capable of affording electroconductivity to the said active material by addition of an appropriate quantity, but usually powdery carbonaceous materials such as acetylene black, carbon black and graphite, and fibers and foils of various metals are preferably used.

As the technique for forming the electrode on the collector, a method is favorably used in which a powdery active material is mixed with a solvent along with a binder and dispersed by a suitable means such as ball mill, sand mill, double-screw kneader, etc., to prepare a coating compound, and this coating compound is applied on the collector and dried. The type of the solvent used in this method is not restricted as far as it is inert to the electrode material and capable of dissolving the binder used. Both inorganic and organic solvents generally used in the art, such as N-methlpyrrolidone for instance, can be used in the present invention.

A layer of electrode material can also be formed, for instance, by a method in which the active material is mixed with a binder and heated into a softened state, and the mixture is coated on the collector by means of press bonding or spraying. It is also possible to form the electrode material layer by calcining the active material singly on the collector.

The thickness of the active material layer is usually not less than 1 μm, preferably not less than 10 μm. Also, it is usually not more than 200 μm, preferably not more than 150 μm. When the active material layer thickness is less than 1 μm, it becomes difficult to secure uniformity of the active material layer, and the battery capacity tends to lower. When the active material layer thickness exceeds 200 μm, rate characteristics may be deteriorated.

In order to further improve adhesion of the active material layer to the collector substrate, a primer layer may be provided between them. Such a primer layer can be formed by applying a coating composition comprising a conductive material, a binder and a solvent on the collector substrate and drying the coat.

As the conductive material of the primer layer, various types of material, for example, granular carbonaceous materials such as carbon black and graphite, metal powder, conductive polymers, etc., can be used. The binder and the solvent used for the primer layer may be the same as used for the active material layer described above. The primer layer thickness is usually not less than 0.05 μm, preferably not less than 0.1 μm. Also, it is usually not more than 20 μm. preferably not more than 10 μm. When the primer layer thickness is less than 0.05 μm, it becomes difficult to secure uniformity of the primer layer. When the layer thickness exceeds 20 μm, the capacity rate characteristics of the battery tends to deteriorate.

Electrolyte:

Electrolyte takes part in the movement of ions between the first and second electrodes in relation to the respective electrodes. Electrolyte usually exists as an electrolyte layer between the electrodes, but it also is present in the active material layer and contacts with the surface of at least part of the active material.

Electrolyte is usually available in various forms including electrolytes having fluidity (liquid electrolytes) and non-fluid electrolytes such as gel-like electrolyte and perfectly solid electrolyte. From the viewpoint of battery performance, liquid electrolyte or gel-like electrolyte is preferred, but from the safety standpoint, non-fluid electrolyte is preferred. It is noticeable that use of non-fluid electrolyte assures more effective prevention of liquid leakage than in the batteries using conventional liquid electrolyte.

Liquid electrolyte is usually produced by dissolving a supporting electrolyte in a non-aqueous solvent.

It is possible to use any type of supporting electrolyte as far as it is stable to the positive and negative electrodes, and is a non-aqueous material whose lithium ions can make movement for undergoing a electrochemical reaction with the positive or negative electrode active material. For instance, lithium salts such as $LiPF_6$, $LiAsF_6$, $LiSbF_6$, $LiBF_4$, $LiClO_4$, LiI, LiBr, LiCl, $LiAlCl$, $LiHF_2$, LiSCN and $LiSO_3CF_2$ can be used as supporting electrolyte. of these lithium salts, $LiPF_6$ and $LiClO_4$ are preferred.

The concentration of the supporting electrolyte when used in a state of being dissolved in a non-aqueous solvent is usually 0.5 to 2.5 mol/L. The type of the non-aqueous solvent used for dissolving the supporting electrolyte is not restricted, but a solvent of a relatively high dielectric constant is preferably used. Examples of such solvents include cyclic carbonates such as ethylene carbonate and propylene carbonate, non-cyclic carbonates such as dimethyl carbonate, diethyl carbonate and ethyl methyl carbonate, glymes such as tetrahydrofuran, 2-methyltetrahydrofuran and dimethoxyethane, lactones such as g-butyrolactone, sulfur compounds such as sulforane, and nitriles such as acetonitrile. Mixtures of these solvents are also usable.

Among the above solvents, one or two or more solvents selected from cyclic carbonates such as ethylene carbonate and propylene carbonate and non-cyclic carbonates such as dimethyl carbonate, diethyl carbonate and ethyl methyl carbonate are preferably used. Those of the above solvents in which part of the hydrogen atoms in the molecule were substituted with a halogen, etc., are also usable. These solvents may contain additives. Additives such as trofluoropropylene carbonate, vinylene carbonate, 1,6-dioxaspiro[4,4]nonane-2,7-dione and 12-crown-4-ether can be used for the purpose of enhancing stability, performance and service life of the battery.

The gel-like electrolyte used for the battery of the present invention is usually of a structure in which the said liquid electrolyte is held by a polymer. That is, a gel-like electrolyte is a type of liquid electrolyte which is held in a polymer network and excessively lowered in fluidity as a whole. Such gel-like electrolytes are closely analogous to the ordinary liquid electrolytes in properties such as ion conductivity, but their fluidity and volatility are excessively suppressed and therefore elevated in safety. The ratio of the polymer in the gel-like electrolyte is preferably 1 to 50% by weight. If the polymer ratio is less than 1% by weight, it may prove hardly possible for the polymer to hold the liquid electrolyte, resulting in causing a liquid leakage. If the polymer ratio exceeds 50% by weight, ion conductivity lowers to deteriorate the battery performance.

The polymers usable for the gel-like electrodes are not specified; it is possible to use any of the polymers which are capable of forming a gel with the liquid electrolyte, and which include those produced from polycondensation of polyesters, polyamides, polycarbonates, polyimides and the like, those produced from polyaddition of polyurethanes and polyureas, and those produced from addition polymerization, for example, acrylic derivative-based polymers such as polymethyl methacrylate and polyvinyl polymers such as polyvinyl acetate, polyvinyl chloride and polyvinylidene fluoride. Polyacrylonitrile and polyvinylidene fluoride can be cited as preferred examples of the said polymers. Here, polyvinylidene fluoride not only denotes homopolymers of vinylidene fluoride but also includes copolymers with other monomers such as hexafluoropropylene. The acrylic derivative-based polymers produced by polymerizing such monomers as acrylic acid, methyl acrylate, ethyl acrylate, ethoxyethyl acrylate, methoxyethyl acrylate, ethoxyethoxyethyl acrylate, polyethylene glycol monoacrylate, ethoxyethyl methacrylate, methoxyethyl methacrylate, ethoxyethoxyethyl methacrylate, polyethylene glycol monomethacrylate, N,N-diethylaminoethyl acrylate, N,N-dimethylaminoethyl acrylate, glycidyl acrylate, allyl acrylate, acrylonitrile, N-vinylpyrrolidone, diethylene glycol diacrylate, triethylene glycol diacrylate, tetraethylene glycol diacrylate, polyethylene glycol diacrylate, diethylene glycol dimethacrylate, triethylene glycol dimethacrylate, tetraethylene glycol dimethacrylate, polyethylene glycol dimethacrylate and the like are also preferably used.

The weight-average molecular weight (Mw) of the electrolyte polymer used in the present invention is usually in the range of 10,000 to 5,000,000. When Mw of the said polymer is less than 10,000, gel is hard to form. When Mw of the polymer exceeds 5,000,000, the polymer is difficult to handle because of too high viscosity. The concentration of the polymer in the electrolyte may be properly selected according to the molecular weight of the polymer used, but it is preferably 0.1 to 30% by weight. When the polymer concentration is less than 0.1% by weight, gel is hard to form and also the electrolyte maintainability of the polymer falls to give rise to the problem of too high fluidity and liquid leakage. When the polymer concentration exceeds 30% by weight, the liquid viscosity becomes too high, making it difficult to carry out the operations. Also, the ratio of the electrolyte lowers to reduce ion conductivity, causing a corresponding deterioration of the battery properties such as rate characteristics.

It is possible to use an electrolyte of a perfectly solid state. Various known solid electrolytes are usable in the present invention. A solid electrolyte can be formed, for instance, by mixing a polymer such as used in the said gel electrolyte with a supporting electrolyte salt in a suitable ratio. In this case, in order to enhance conductivity, it is preferable to use a polymer of high polarity and of a skeletal structure having many side chains.

EXAMPLES

The present invention will be described in more detail by reference to the following examples. In these examples, although a lithium secondary cell was used as the secondary electrochemical cell, it is not intended to limit the present invention thereto. As will be understood, various modifications and changes can be made within the scope of the present invention.

Meanwhile, in the following Examples and Comparative Examples, the "part" described in the respective compositions, represents "part by weight".

Example 1

First, respective coating materials for forming positive electrode, negative electrode and electrolyte, were prepared by the following methods.

Production of Positive Electrode:

The positive electrode coating material having the following composition was prepared.

Composition of Positive Electrode Coating Material:

| | |
|---|---|
| Lithium cobaltate (LiCoO$_2$) | 90 parts |
| Acetylene black | 5 parts |
| Polyvinylidene fluoride | 5 parts |
| N-methyl-2-pyrrolidone | 80 parts |

The above raw materials were kneaded with each other for 2 hours using a planetary mixer to prepare a positive electrode coating material. The thus obtained positive electrode coating material was applied onto a 15 μm-thick aluminum current collector substrate using an extrusion-type die coater and then dried, thereby forming thereon a positive electrode material layer comprising an active material bonded to the current collector through a binder. The coated current collector was compressed using a roll press (calender) to prepare an electrode sheet. Then, the electrode sheet was cut to produce a positive electrode. The obtained positive electrode contained a positive electrode active material in an amount of 9 mg/cm$^2$.

Production of Negative Electrode:

The negative electrode coating material having the following composition was prepared.

Composition of Negative Electrode Coating Material:

| | |
|---|---|
| Graphite (particle size: 15 μm) | 90 parts |
| Polyvinylidene fluoride | 10 parts |
| N-methyl-2-pyrrolidone | 100 parts |

The above raw materials were kneaded with each other for 2 hours using a planetary mixer-type kneader to prepare a negative electrode coating material. The thus obtained negative electrode coating material was applied onto a 20 μm-thick copper current collector substrate using an extrusion-type die coater and then dried, thereby forming thereon a negative electrode material layer comprising an active material bonded to the current collector through a binder. The coated current collector was compressed using a roll press (calender) to prepare an electrode sheet. Then, the electrode sheet was cut to produce a negative electrode.

Ratio Between Positive Electrode Material Layer and Negative Electrode Material Layer:

Upon the production of positive and negative electrodes, the respective thicknesses of the positive electrode material layer and the negative electrode material layer were controlled such that the ratio of a charge capacity per unit area of the positive electrode to that of the negative electrode is 0.93. Here, the charge capacity of the positive electrode means a capacity obtained upon charging a cell using the positive electrode together with a lithium counter electrode from 2.7 V to 4.1 V; and the charge capacity of the negative electrode means a capacity obtained upon charging the cell using the negative electrode together with a lithium counter electrode from 3 mV to 1.5 V.

Production of Electrolyte Coating Material:

The below-mentioned components were mixed, stirred and dissolved together to prepare an electrolyte coating material.

Composition of Electrolyte Coating Material:

| | |
|---|---|
| Electrolyte solution | 990 parts |
|   Mixed solution of ethylene carbonate and propylene carbonate containing 1M LiPF$_6$ (volume ratio of ethylene carbonate to propylene carbonate: 1:1) | |
| Tetraethylene glycol diacrylate | 50 parts |
| Polyethyleneoxide triacrylate | 25 parts |
| Isophorone (molecular weight: 138) | 10 parts* |
| Polymerization initiator | 2 parts |

Note*: The content of isophorone was 1.0 part based on 100 parts by weight of the isophorone-containing electrolyte solution.

The thus prepared electrolyte coating material was applied onto the positive and negative electrodes which were identical in surface area to each other. Separately, a polymer porous film was immersed in the electrolyte coating material to prepare a spacer. The spacer was interposed between the positive and negative electrodes. The obtained laminate was then heated at 90° C. for 10 minutes to polymerize tetraethylene glycol diacrylate and polyethyleneoxide triacrylate contained in the electrolyte coating material with each other. As a result, there was produced a plate-like cell element comprising the positive and negative electrodes respectively containing an active material and a binder and being formed on the current collector, and an electrolyte non-fluidized between the positive and negative electrodes. The thus obtained cell element was received in a bag-like casing which was formed by folding a laminated film obtained by coating both surfaces of an aluminum film with a resin layer, and then the bag-like casing was vacuum-sealed along its open side, thereby producing a plate-like lithium secondary cell A.

Example 2

The same procedure as defined in Example 1 was conducted except that isophorone contained in the electrolyte coating material was changed to 4-methyl-tetrahydro-pyran-2,6-dione (molecular weight: 128), thereby producing a lithium secondary cell B. Example 3

The same procedure as defined in Example 1 was conducted except that isophorone contained in the electrolyte coating material was changed to 1-methyl-pyrrolidone-2,5-dione (molecular weight: 113), thereby producing a lithium secondary cell C.

Comparative Example 1

The same procedure as defined in Example 1 was conducted except that isophorone contained in the electrolyte coating material was changed to succinic anhydride (molecular weight: 100), thereby producing a lithium secondary cell D.

Comparative Example 2

The same procedure as defined in Example 1 was conducted without using isophorone, that is, electrolyte coating containing no additive, thereby producing a lithium secondary cell E.

The charge and discharge performance of each of the thus produced lithium secondary cells A to E was evaluated by the following methods. The results are shown in Table 1.

Measurement of First Cycle Coulombic Efficiency:

(1) First, the cell was charged at a current density of 0.5 mA/cm$^2$ until the cell voltage reached 4.1 V. The charge capacity of the cell per unit weight of the positive electrode active material as determined by the above method is called a "first cycle charge capacity (unit: mAh/g)". Then, the cell was discharged at a current density of 0.2 mA/cm² until the cell voltage was reduced to 2.7 V. The discharge capacity of the cell per unit weight of the positive electrode active material as determined by the above method is called a "first cycle discharge capacity". The ratio of the "first cycle discharge capacity" to the "first cycle charge capacity" was defined as a "first cycle coulombic efficiency".

Measurement of Rate Characteristics and Capacity Retention Percentage After Charge and Discharge Cycles:

(2) Next, the cell was charged at a current density of 1.0 mA/cm² until the cell voltage reached 4.1 V, and then discharged at a current density of 0.5 mA/cm² until the cell voltage was reduced to 2.7 V. Successively, the cell was charged at a current density of 1.0 mA/cm² until the cell voltage reached 4.1 V, and then discharged at a current density of 1.0 mA/cm² until the cell voltage was reduced to 2.7 V. Further, the cell was charged at a current density of 1.0 mA/cm² until the cell voltage reached 4.1 V, and then discharged at a current density of 2.0 mA/cm² until the cell voltage was reduced to 2.7 V. The discharge capacity per unit weight of the positive electrode active material at the last discharge cycle conducted at current density of 2.0 mA/cm², is called a "high-rate discharge capacity". The ratio of the "high-rate discharge capacity" to the "first cycle discharge capacity" was defined as "rate characteristics". Here, the larger the ratio of the "high-rate discharge capacity" to the "first cycle discharge capacity", the more excellent the rate characteristics.

(3) Furthermore, the cell was charger at a current density of 1.0 mA/cm² until the cell voltage reached 4.1 V, and then discharged at a current density of 0.2 mA/cm² until the cell voltage was reduced to 2.7 V. The discharge capacity obtained at the discharge cycle is called a "discharge capacity after rate test". Also, the ratio of the "discharge capacity after rate test" to the "first cycle discharge capacity" is called as a "capacity retention percentage after repeating charge and discharge cycles".

Evaluation of Gas Generation

Gas generation within lithium secondary cell was evaluated by observing the bulge of the plate-like cell container, at the stage of first cycle charge and first cycle discharge. When bulge of the plate-like cell container was observed as far as observing visually, the evaluation of gas generation was "generated" (Not Good); and when almost no bulge of the plate-like cell container was observed as far as observing visually, the evaluation of gas generation was "not generated" (Good).

TABLE 1

| Cell | Cell A | Cell B |
|---|---|---|
| Additive[1] | Isophorone (Molecular weight: 138) | 4-methyl-tetrahydro-pyran-2,6-dione (Molecular weight: 128) |
| First cycle coulombic efficiency (%) | 85.4 | 90.0 |
| Rate characteristics (%) | 96.0 | 91.2 |
| Capacity retention percentage after repeating charge and discharge cycles (%) | 98.2 | 95.4 |
| Gas generation | Good | Good |

TABLE 1-continued

| Cell | Cell C | Cell D |
|---|---|---|
| Additive[1] | 1-Methyl-pyrrolidine-2,5-dione (Molecular weight: 113) | Succinic anhydride (Molecular weight: 100) |
| First cycle coulombic efficiency (%) | 83.9 | 90.6 |
| Rate characteristics (%) | 95.5 | 93.6 |
| Capacity retention percentage after repeating charge and discharge cycles (%) | 97.8 | 93.6 |
| Gas generation | Good | Good |

| Cell | Cell E |
|---|---|
| Additive[1] | None |
| First cycle coulombic efficiency (%) | 76.5 |
| Rate characteristics (%) | 63.0 |
| Capacity retention percentage after repeating charge and discharge cycles (%) | 94.6 |
| Gas generation | Not Good |

1) The chemical structures of additive are set forth below.

Isophorone:

Isophorone:

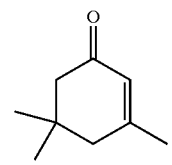

4-methyl-tetrahydro-pyran-2,6-dione:

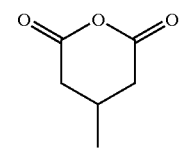

1-methyl-pyrrolidine-2,5-dione:

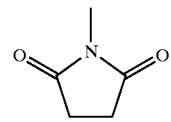

Succinic anhydride:

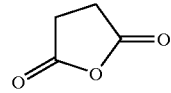

First, first cycle coulombic efficiency and rate characteristics of cell E were too lower than those of cells A to D. Moreover, only in case of cell E, gas generation was observed. This means that by using no specific additives, cell properties becomes quite poor.

Next, all of the cells A to D exhibited an excellent first cycle coulombic efficiency. However, when the first cycle coulombic efficiency, rate characteristics and capacity retention percentage after repeating charge and discharge cycles were totally taken into consideration, it was confirmed that the properties of the lithium secondary cell D using the electrolyte solution containing succinic anhydride having a molecular weight of 100 were unsatisfactory. When the succinic anhydride was added to the electrolyte solution, the capacity retention percentage after repeating charge and discharge cycles was more remarkably deteriorated as compared to the cases where the other three additives were used. On the other hand, when isophorone having a molecular weight of 138, 4-methyl-tetrahydro-pyran-2,6-dione having a molecular weight of 128 and 1-methyl-pyrrolidone-2,5-dione having a molecular weight of 113 were used, the above three properties were well-balanced.

From the above-described results, it was confirmed that when the specific additives having a molecular weight of not less than 105 were added to the electrolyte solution, there were obtained lithium secondary cells which were excellent in all of first cycle coulombic efficiency, rate characteristics, capacity retention percentage after repeating charge and discharge cycles and gas generation.

What is claimed is:

1. An electrochemical cell having a controlled electrode surface, comprising:

a first electrode and a second electrode wherein at least one of the first and second electrodes has a carbonaceous surface;

an electrolyte containing at least one solvent;

an additive associated with the carbonaceous surface of at least one of the first and second electrodes, wherein the additive comprises one or more compounds selected from the group consisting of 4-methyl-tetrahydropyran-2,6-dione, isophorene, 8-methyl-4-oxa-tricyclo[5.2.1.0$^{2,6}$]dec-8-ene-3,5-dione, 6a-methyl-hexahydrofuro[2,3-b]furan-2,5-dione, 1,8,8-trimethyl-3-oxyabicyclo[3.2.1]octane-2,4-dione, and 1-methyl-pyrrolidine-2,5-dione.

2. The electrochemical cell according to claim 1, further comprising means associated with the additive for substantially precluding gas formation within the electrochemical cell as a result of decomposition of the additive during cell cycling and storage.

3. The electrochemical according to claim 1, further comprising means for increasing first cycle coulombic efficiency of the electrochemical cell relative to an electrochemical cell without the additive.

4. The electrochemical cell according to claim 3, wherein the efficiency increasing means comprises the additive.

5. The electrochemical cell according to claim 1, wherein the additive is substantially soluble in the solvent of the electrolyte at ambient temperature.

6. The electrochemical cell according to claim 1, wherein the additive is substantially insoluble in the solvent of the electrolyte at ambient temperature.

* * * * *